(12) United States Patent
Ramos et al.

(10) Patent No.: US 8,691,159 B2
(45) Date of Patent: Apr. 8, 2014

(54) MODULAR CATALYST BED SUPPORT

(75) Inventors: Antonio O. Ramos, Houston, TX (US); Benjamin S. Umansky, Fairfax, VA (US); William J. Tracy, III, Burke, VA (US); Ramesh X. Gandhi, Ashburn, VA (US); Hans G. Korsten, Fairfax, VA (US); John T. Wyatt, Jr., Alexandria, VA (US); William J. Novak, Bedminster, NJ (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 219 days.

(21) Appl. No.: 13/420,737

(22) Filed: Mar. 15, 2012

(65) Prior Publication Data

US 2012/0237415 A1  Sep. 20, 2012

Related U.S. Application Data

(60) Provisional application No. 61/453,214, filed on Mar. 16, 2011.

(51) Int. Cl.
*B01J 8/04* (2006.01)
*B01J 8/00* (2006.01)

(52) U.S. Cl.
CPC ........ *B01J 8/008* (2013.01); *B01J 2208/00884* (2013.01); *B01J 8/04* (2013.01); *B01J 8/0453* (2013.01)
USPC .............. 422/311; 422/220; 422/648; 29/890

(58) Field of Classification Search
CPC .............. B01J 8/008; B01J 8/04; B01J 8/048; B01J 8/0449; B01J 8/0453; B01J 8/0476; B01J 8/0015; B01J 2208/00884; B01J 2208/027; B01J 19/32
USPC .............................. 422/311, 220, 648; 29/890
See application file for complete search history.

(56) References Cited

U.S. PATENT DOCUMENTS

| | | | |
|---|---|---|---|
| 3,489,529 A * | 1/1970 | Dudych et al. ................ | 422/605 |
| 4,683,121 A | 7/1987 | Goudriaan et al. | |
| 5,879,642 A | 3/1999 | Trimble et al. | |
| 6,878,351 B1 | 4/2005 | Davies | |
| 2004/0141892 A1 * | 7/2004 | Van Hasselt et al. ......... | 422/195 |
| 2010/0074812 A1 | 3/2010 | Burlingame et al. | |

* cited by examiner

*Primary Examiner* — Lessanework Seifu
(74) *Attorney, Agent, or Firm* — David M. Weisberg; Bruce M. Bordelon; Chad A. Guice

(57) ABSTRACT

A modular catalyst bed support can be used to increase the number of catalyst beds available in a reactor. The modular catalyst bed support can include a lattice with a plurality of lattice openings and modules inserted into the lattice openings. The modular catalyst bed support can rest on top of an underlying catalyst bed, which can reduce or eliminate the need for attachment of the modular catalyst bed support to the walls of the reactor.

20 Claims, 13 Drawing Sheets

MODULAR CATALYST BED SUPPORT

CROSS-REFERENCE TO RELATED APPLICATION

This application claims priority to U.S. Provisional Application Ser. No. 61/453,214 filed Mar. 16, 2011, which is herein incorporated by reference in its entirety.

FIELD OF THE INVENTION

Structures and methods are described below for adding a catalyst bed to a reactor.

BACKGROUND OF THE INVENTION

Reactors for petroleum refining can remain viable from a structural standpoint for multiple decades. However, during this lengthy time period, advancements in refining technology may lead to improved designs or methods that do not match the original reactor structure. Systems and/or methods that allow older reactors to be upgraded to take advantage of newer technologies can result in substantial cost savings, in comparison with retiring a reactor and building a new structure.

Many conventional or heritage catalytic reactors for petroleum refining are single bed reactors. Some of these reactors can have long reactor beds relative to the inner diameter of the reactor. For example, a ratio of the length of the reactor bed to the inner diameter of the reactor can be at least about 4 to 1 or greater. Although the long reactor bed can hold a large volume of catalyst, the single bed configuration can lead to reduced catalyst effectiveness.

One reason for reduced catalyst effectiveness can be poor flow distribution. A poor flow distribution can develop within a catalyst bed for a variety of reasons. The length of the catalyst bed can be one factor, with longer beds typically having an increased likelihood of flow distribution problems. Another problem can be having a low liquid mass flux through the bed, where the amount of liquid flowing through the bed per unit area and per unit time is too low to provide good flow characteristics. Other factors that can contribute to a poor flow distribution can be related to flow bridging within the bed, poor loading of catalyst into the catalyst bed, or liquid plugging. An example of a poor flow distribution can be "channeling" of a feed, where the feed preferentially passes through a portion of the catalyst while exposing other portions of the catalyst to little or no fluid flow. In a single bed reactor, if a problem develops with the flow pattern of the fluids passing through the single catalyst bed, the resulting poor flow distribution will likely continue for the entire length of the bed.

SUMMARY OF THE INVENTION

One aspect of the invention relates to a modular catalyst bed support that is not welded to the walls of a reactor, comprising: a lattice structure having a plurality of lattice openings; a plurality of endcap pieces attached to the lattice structure to form a lattice skirt; and a plurality of modules inserted into the lattice openings, a module comprising: a top surface, the plurality of module top surfaces forming a catalyst support surface; a bottom surface; and an interior surface that includes a lip, the lip overlapping one or more edges of the lattice structure when a module is inserted into a lattice opening, the plurality of module interior surfaces forming a flow distributor, wherein the modular catalyst bed support is formed from pieces that can pass through an opening having a diameter of about 28 inches or less.

Another aspect of the invention relates to a kit for assembly of a modular catalyst bed support that is not welded to the walls of a reactor, comprising: a plurality of lattice pieces that can be joined together to form a lattice structure having a plurality of lattice openings; a plurality of endcap pieces capable of being attached to the lattice structure to form a lattice skirt; and a plurality of modules capable of being inserted into the lattice openings, a module comprising: a top surface, the plurality of module top surfaces, when assembled, forming a catalyst support surface; a bottom surface; and an interior surface that includes a lip, the lip overlapping one or more edges of the lattice structure when a module is inserted into a lattice opening, the plurality of module interior surfaces forming a flow distributor when assembled, wherein the kit for assembly of the modular catalyst bed support is formed from pieces that can pass through an opening having a diameter of about 28 inches or less.

Still another aspect of the invention relates to a method for dividing a catalyst bed in a reactor without welding a catalyst bed platform to a structural portion of the reactor walls, comprising: passing a plurality of modular catalyst bed support components into a reactor through an opening having a diameter of about 28 inches or less, the reactor having a first catalyst bed volume, the modular catalyst bed support components including lattice components and a plurality of modules; constructing a modular catalyst bed support within the reactor using the modular catalyst bed support components; supporting the modular catalyst bed support with a plurality of bed support hangers; loading a lower catalyst bed in a lower catalyst bed volume; supporting the modular catalyst bed support on the lower catalyst bed; and loading an upper catalyst bed that is supported by the modular catalyst bed support in an upper catalyst bed volume, wherein at least one of the upper catalyst bed volume and the lower catalyst bed volume has a length to diameter ratio of about 4 to 1 or less.

DETAILED DESCRIPTION OF THE EMBODIMENTS

Overview

Figure 1:
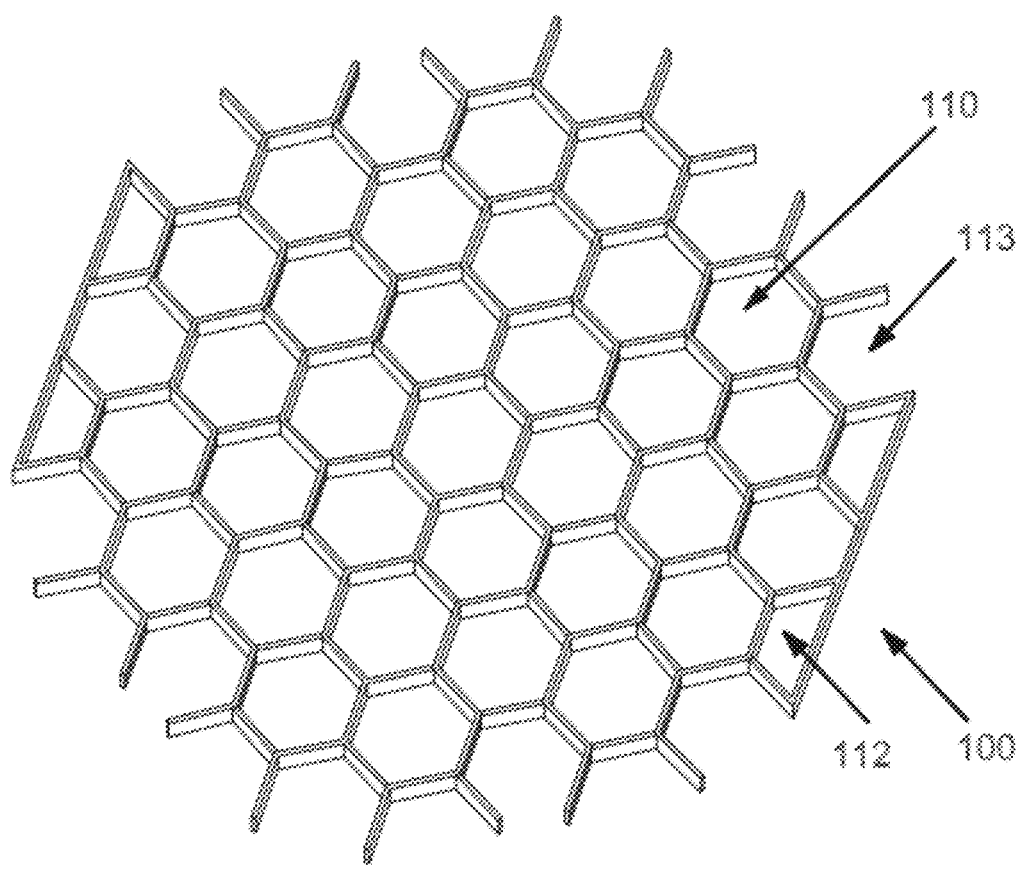
FIG. 1 schematically depicts a lattice structure according to an embodiment of the invention.

In various embodiments, a modular catalyst bed support is provided that can advantageously be used with an existing reactor. For example, addition of a modular catalyst bed support can convert a reactor with a single catalyst bed to a reactor with two catalyst beds (and it is contemplated that use of more than one bed support can result in a reactor with multiple catalyst beds). A modular catalyst bed support can have a top surface that is suitable for supporting a catalyst bed, such as a mesh or wire grating. The bottom of the modular catalyst bed support can be suitable for resting on a lower catalyst bed, so that an upper catalyst bed can be supported by the top surface. Adding a modular catalyst bed support to a reactor can allow for addition of a flow distributor (such as a distributor tray) and/or a quench system to a reactor. The flow distributor and/or quench system can be added in the space created between the top and bottom surfaces of the modular catalyst bed support. Addition of a distributor tray can allow for improved fluid flow within a reactor, which can result in a corresponding increase in the apparent activity of catalyst.

Multiple bed reactors can be used for a variety of refinery processes, e.g., hydroprocessing processes such as hydrodesulfurization processes and cold flow improvement processes. In a multiple bed reactor, a distributor tray or other reactor internal for distributing fluid flow can be used between beds to redistribute the fluid flow between beds. However, proper operation of a distributor tray typically requires space between the tray and the catalyst bed upstream from the tray, as flow re-distribution typically cannot be achieved in a single catalyst bed system.

Adding a catalyst bed to a reactor can pose a variety of challenges. One option for adding a catalyst bed to a reactor can be to weld a catalyst bed platform to the structural portion of the reactor walks). In this option, the welds to the structural portion of the reactor wall can support the weight of the catalyst bed. Adding a catalyst bed to a reactor in this manner can require a substantial length of time where the reactor is not operational. Additionally, the impact of heating the structural materials of the reactor wall to a sufficient temperature for welding may be unclear.

An additional issue with adding a catalyst bed to a reactor can be the method of access to the inside of the reactor. A typical commercial reactor will generally allow access to the reactor through a top manway, which can have an inner diameter, e.g., from about 18 inches (about 46 cm) to about 36 inches (about 91 cm). Some typical manways in older reactors can have inner diameters from about 20 inches (about 51 cm) to about 24 inches (about 61 cm). Other common examples of manway diameters can be at least about 20 inches (about 51 cm), for example at least about 22 inches (about 56 cm), at least about 24 inches (about 61 cm), at least about 26 inches (about 66 cm), or at least about 28 inches (about 71 cm). Unless a hole is cut in the reactor wall, the materials for adding the catalyst bed to the reactor have to enter the reactor through an existing opening. The manway is typically the largest existing opening available in a reactor for introducing components to add a catalyst bed. Thus, depending on the embodiment, the pieces for constructing a catalyst bed platform structure can be pieces that can pass through an opening having a diameter of about 36 inches (about 91 cm) or less, for example about 28 inches (about 71 cm) or less, about 26 inches (about 66 cm) or less, about 24 inches (about 61 cm) or less about 22 inches (about 56 cm) or less, or about 20 inches (about 51 cm) or less.

Another consideration for adding a catalyst bed platform to a reactor can be the structural integrity of the additional bed platform. A catalyst bed can have a substantial weight when loaded into a reactor. In addition to this static weight, a catalyst bed platform can also experience a load due to the pressure drop of fluid passing through the catalyst bed during operation.

In various embodiments, structures, kits, and methods are provided for upgrading a reactor to include an additional catalyst bed. In an embodiment, a modular catalyst bed support can be constructed within a reactor to allow for separation of an internal space within a reactor into multiple catalyst beds. The modular catalyst bed support can be constructed from pieces (and/or a kit containing pieces) that can enter the reactor through an existing opening, such as a manway.

One portion of a modular catalyst bed support can be a honeycomb or lattice structure. The lattice structure can be constructed from a plurality of pieces (and/or a kit containing a plurality of pieces) that can pass through an existing opening in the reactor. The lattice structure can be formed so that the lattice openings correspond to a single shape that forms a tessellation, such as hexagons or squares or the like, or from two or more shapes that together can form a tessellation (such as octagons and squares or pentagons and hexagons or the like). The majority of the openings in the lattice structure can correspond to these regular openings. At the edge(s) of the lattice structure, which will typically be at or near the wall(s) of the reactor, half-size or two-thirds-size lattice openings can be used to better match/mimic the shape of the lattice to the cross-section of the reactor. The pieces used to form the lattice can be attached, using interlocking lips, to reduce or minimize the amount of welding required within a reactor.

The openings in the lattice can be filled with modular inserts. The modular inserts can include a foot or base, a top surface for supporting a catalyst bed, and a middle structure that forms a flow distributor when combined with the lattice structure and the other modular inserts. The openings in the lattice structure can have an area that is smaller than the area of an existing opening, such as a manway. This can allow the modular inserts to pass through such an existing opening in the reactor. Using modules that can pass through an existing opening can reduce or minimize the amount of work required inside the reactor to allow for addition of a catalyst bed.

After assembly, the modular catalyst bed support can be supported by resting on a catalyst bed below the modular catalyst bed support. As a result, the modular catalyst bed support may not need (and in some preferred embodiments, does not need) to be supported by the wall(s) of the reactor. This can eliminate the need to weld the modular catalyst bed support to the wall(s) of the reactor.

The modular catalyst bed support can also include a flow distributor, such as a distributor tray with downcomers. The distributor tray can be formed by plates located between the top and bottom surfaces of the individual modules. The plates can have a lip that overlaps with one or more edges of the lattice structure to form the flow distributor structure. Optionally, a gasket can be included at the location where the lip overlaps with the lattice structure. The optional gasket can assist with providing a better seal between the lip and the honeycomb structure, e.g., to reduce any potential leakage through the distributor tray.

A modular catalyst bed support can provide a variety of advantages relative to a conventional catalyst bed platform welded to a reactor wall. In some embodiments, installing a modular catalyst bed support can reduce the non-operational time required for adding the catalyst bed. A modular catalyst bed support can be constructed using a scaffold within the reactor. Because welding to the structural portion of the reactor wall is not required, the amount of time for installation can be reduced.

In some embodiments, the addition of a catalyst bed platform can improve the flow characteristics within a reactor. For example, one method for characterizing a reactor can be the length of catalyst beds within the reactor versus the diameter of the reactor. A modular catalyst bed support can be added to a reactor with any convenient number of existing beds. Addition of a modular catalyst bed support can allow an existing catalyst bed to be split into two catalyst beds. For example, in an embodiment involving a reactor with a single catalyst bed, the single bed can initially have a ratio of catalyst bed length to reactor diameter of at least about 3:1, for example at least about 4:1, at least about 5:1, at least about 6:1, at least about 7:1, or at least about 8:1. In such an embodiment, a catalyst bed platform can be added to the reactor to allow formation of two catalyst beds, such that at least one of the resulting catalyst beds can have a ratio of catalyst bed length to reactor diameter of about 4:1 or less, for example about 3:1 or less, about 2.5:1 or less, about 2:1 or less, or about 1.5:1 or less. Additionally, or alternately, both resulting catalyst beds can have a ratio of catalyst bed length to reactor diameter of about 3:1 or less, for example about 2.5:1 or less or about 2:1 or less. Further additionally or alternately, addition of a modular catalyst bed support within a reactor can reduce the total amount of catalyst loaded into the reactor. However, due to improved flow characteristics, the reduced amount of catalyst can be used more efficiently, leading to a higher apparent activity for the catalyst Modular Catalyst Bed Support—Lattice Structure In various embodiments, the modular catalyst bed support can include a lattice structure. The lattice structure can serve as a stabilizing structure for the modular catalyst bed support by providing a lateral connection between modules. The lattice structure can also assist with maintaining the location of a module after insertion. The lattice structure can help to reduce/prevent lateral movement of the modules, for example, during lowering of the modular catalyst bed support onto an underlying catalyst bed prior to operation of the reactor. During operation of a reactor, the modular catalyst bed support can rest on an underlying catalyst bed. Any lateral motion of modules while in contact with the catalyst bed could result in an uneven surface for the catalyst bed, and therefore a tilted orientation for the modular catalyst bed structure. A level orientation can be valuable for a flow distributor, such as the flow distributor formed by the middle surfaces of the modules in a modular catalyst bed support.

The lattice structure can include a plurality of openings. In an embodiment, at least a portion of the openings can form a repeating pattern of openings with similar size, such as a tessellation of hexagons, squares, octagons/squares, hexagons/pentagons, or other parallelepiped shapes. Having regular openings in the lattice structure can reduce the number of different types of modules needed to form the bed support.

It can be desirable to have the shape of the lattice structure roughly match the interior shape of the reactor. However, reactors involving catalyst beds can often have roughly circular cross sections, while the repeating pattern of openings in the lattice structure can typically be a non-circular shape, such as a hexagon or rectangle. As a result, the overall shape of the lattice structure can be more like an approximation of a circular shape. In order to improve this approximation, additional types of openings can be included in the lattice structure. For example, for a lattice structure with hexagonal openings, the additional opening shapes can correspond to shapes that are half of a hexagon or two thirds of a hexagon. The additional shapes can be used at the edges of the lattice structure to reduce the amount of gap between the interior reactor wall and the edge of the lattice structure. Using the half-hexagon and two-thirds-hexagon shapes can improve the ability of the lattice structure to fill the reactor cross-section while still maintaining a relatively low number of different types of modules. Using this type of design, just a few types of modules can be used to add a modular catalyst bed support to a variety of reactors. By contrast, the size of a lattice structure can be varied to match the internal diameter of each reactor.

In some embodiments, the gap between the lattice structure and the interior reactor wall can be further reduced by using end cap and/or side plate structures. One surface of the end caps can be designed to provide a roughly circular perimeter or lattice skirt for the lattice structure, while the inner surface can match the shape formed by the full and partial lattice openings. In certain embodiments, any gap remaining between the lattice skirt and the inner surface of the reactor wall can then be bridged using a fill material, such as a fiberglass rope material.

Additionally or alternately, the catalyst bed platform can have an outer diameter deliberately smaller than the inner diameter of the reactor. In this type of embodiment, the lattice skirt for the modular catalyst bed support can optionally include a lip that protrudes out toward the inner wall of the reactor. The lip can be located at an intermediate location on the outer surface of the modular catalyst bed support, such as halfway between the top of the skirt and the bottom of the skirt, or at another location closer to either the top of the outer surface or closer to the bottom of the outer surface. The gap between the outer surface of the skirt and the inner surface of the reactor wall can then be filled with a material that substantially fills the space between the outer surface of the skirt and the inner surface of the reactor wall. The fill material can be, for example, a glass rope material such as one that substantially fills the space in the gap. The fill material can reduce and/or eliminate the amount of feed that passes around the modular catalyst bed support, as opposed to passing through the catalyst bed.

The lattice structure can be formed from pieces (and/or a kit containing pieces) or lattice components that can fit through an existing opening in the reactor, such as a manway. One option can be to use interlocking pieces to form a lattice structure. This can reduce the amount of welding required inside of a reactor to install the lattice structure.

Catalyst Bed Modules

Another type of component for a modular catalyst bed support can be catalyst bed modules. The openings in the lattice structure can be filled by inserting catalyst bed modules into the lattice openings. The catalyst bed modules can include several surfaces. A top surface of the catalyst bed module can be a surface suitable for supporting a catalyst bed. After assembly of the catalyst bed modules into the lattice openings, the top surfaces of the modules can form a continuous surface that prevents (most) catalyst particles from passing through the continuous surface. The top surface of the catalyst bed module can be formed from any convenient material for supporting a bed of catalyst particles, such as a mesh or grid having a size smaller than the average size of the catalyst particles.

A second surface of the catalyst bed module can be a bottom or foot surface. After insertion of the catalyst bed modules into the lattice, the weight of the modular catalyst bed platform can be supported by the assembled bottom surfaces of the modules, which can rest on a catalyst bed below the modular catalyst bed platform. This weight of the modular catalyst bed platform can include the weight of any catalyst that is being supported by the modular catalyst bed platform. The bottom or foot surface can be formed from any convenient material that allows fluid to pass through while supporting the modular catalyst bed platform on the underlying catalyst bed. Examples of suitable materials for the bottom or foot surface can include, but are not limited to, profile wire, perforated plate, a grating or mesh, or the like, or combinations thereof.

The size of the bottom or foot surface of a catalyst bed module can be selected to allow the foot of the catalyst bed module to pass through a lattice opening. This can allow the catalyst bed modules to be assembled into the lattice opening by inserting the bottom of the modules into the opening. It is noted that this may create a bottom surface for the modular catalyst bed support that is not continuous. Instead, the bottom surface of the modular catalyst bed support can have a small gap between adjacent modules. The gap can approximately correspond to the width of an edge of the lattice structure. The gap between the bottom surfaces of catalyst bed modules can be small enough that particles from the underlying catalyst bed cannot pass through the gap. For example, a catalyst bed can often include a layer of inert particles at the top of the bed. The inert particles can all be of a single size, or the inert particles can vary in size, such as by having the largest inert particles at the top of the bed. Typical diameters for inert particles at the top of a catalyst bed can be at least about 0.25 inches (about 0.6 cm), for example at least about 0.5 inches (about 1.3 cm) or at least about 0.75 inches (about 1.9 cm). The gap between the bottom surfaces of adjacent modules can be small enough so that the inert particles at the top of the catalyst bed do not pass through such a gap.

A third surface of the catalyst bed module can be an interior surface located between the top surface and the bottom surface. After assembly of the catalyst bed modules into the lattice openings, the assembled third surface(s) can form a flow distributor, such as a distributor tray with downcomers. The interior surfaces for forming the flow distributor can have a slightly larger size than the lattice opening for the catalyst bed module. This can be viewed as the interior third surface having a lip around at least a portion of the perimeter of the interior third surface. The lip can extend over the edge of the lattice structure.

One option can be to have a lip that extends around the full perimeter of the interior surface of the catalyst bed modules. The lip can extend over the edge of the lattice structure by up to about half of the width of the lattice side/spine, allowing the interior surface (and therefore the catalyst bed module) to rest on the surrounding lattice. A lip from an adjacent surface can extend over the edge of a lattice structure side/spine by the same amount to form a continuous surface for the flow distributor. The lip(s) in combination with the lattice side(s)/spine(s) can form a surface that minimizes and/or prevents leaks through the flow distributor. Optionally, the lip(s) can extend over the edge of the lattice structure by a sufficient amount so that the lip(s) from adjacent module(s) are in contact. Additionally or alternatively, the connection between the adjacent surface(s) of the lip(s) and/or the lattice structure can be enhanced, such as by using a glass tape material to connect the surface(s) and/or using a gasket to improve the seal(s) between adjacent surface(s).

The surfaces of a catalyst bed module can be connected to one another so that a volume exists between the top surface and the interior surface. A volume can additionally or alternately exist between the interior surface and the bottom surface. For example, a catalyst bed module can have at least three surfaces, such as a top surface, an interior surface, and a bottom surface. The surfaces can be connected together to form a cage structure, such as by having vertical supports that connect the surfaces. The volumes between the surfaces in the catalyst bed modules can improve the operation of the resulting flow distributor that is formed when the modular catalyst bed support is assembled.

In a conventional design, a catalyst bed platform can be supported by attaching the platform to the structural portion of the reactor wall(s). For an existing reactor, this can require welding the catalyst bed platform to the bulk structural material that is underneath a protective cladding or coating. In various embodiments, attachment of the modular catalyst bed support to the bulk structural material of the reactor wall(s) can be avoided by allowing the modular catalyst bed support to be supported by a lower catalyst bed. Although the end caps and/or lattice skirt may not contact the interior reactor walls in some embodiments, a fill material (such as glass rope) can be in contact with both the lattice skirt and the interior reactor wall(s). This can assist in stabilizing the level of the modular catalyst bed support in the reactor. The lattice structure can thus improve the stability of the modular catalyst bed platform, by allowing the modules to move as a single unit, and/or can assist the modular catalyst bed support in remaining level in the reactor.

Flow Distributor

In a catalyst bed, a fluid flowing through the catalyst bed may have an uneven distribution for a variety of reasons. The length of the catalyst bed can be one factor, with longer beds typically having an increased likelihood of flow distribution problems. An additional or alternate problem can be having a low liquid mass flux through the bed, where the amount of liquid flowing through the bed per unit area and per unit time can be too low to provide uniform flow characteristics. Other additional or alternate factors that can contribute to a poor flow distribution can be related to flow bridging within the bed, poor loading of catalyst into the catalyst bed, and/or liquid plugging. A further additional or alternate factor can be that the fluid flowing through the catalyst bed may have entered the bed with an uneven distribution. A still further additional or alternate factor can be related to changes in the catalyst in a catalyst bed as fluid is processed in a reactor. For example, some hydroprocessing reactions can result in formation of "coke" on catalyst particles. The formation of "coke" or other changes in the shape of catalyst particles during reaction may alter the space available for fluid flow and/or can lead to random channeling in a catalyst bed. Yet a further additional or alternate possibility is that local formation of "hot spots" in a catalyst bed may alter the flow of fluid through the bed.

When a fluid flow emerges from a catalyst bed, it can be desirable to redistribute the flow, so that the flow can be more evenly distributed when exposed to the next catalyst bed or other reaction stage. This can have a variety of advantages, such as extending the lifetime of catalyst particles and/or reducing potential hazards, such as localized heating in a catalyst bed. A variety of flow distribution devices are available for use. The devices typically include a plate or tray of some type with a plurality of openings to allow fluid to pass through. If too much flow is incident on a portion of the tray or plate, not all of the fluid may be able to pass through the openings near the flow. In such situations, the liquid level in the tray or plate can instead equilibrate, resulting in distribution of the flow over a larger portion of the area of the tray or plate. One or more such trays or plates can be used in a flow distribution device.

During operation, a flow distributor can typically have at least a small height of accumulated liquid in or on the device. If a distribution device is located immediately adjacent to a catalyst bed, this could result in fluid remaining in contact with catalyst for a longer period of time than desired, and/or stagnation of a portion of the fluid in a catalyst bed. To avoid this situation, it can be desirable to have a gap between a catalyst bed and a flow distributor. In a reactor with only a single catalyst bed, such a gap typically does not exist. As a result, if the fluid flow through a single catalyst bed develops an uneven distribution near the top of the bed, that uneven distribution is likely to remain through the entire bed.

In various embodiments, inserting a modular catalyst bed support into a reactor can allow a catalyst bed to be divided into two beds having shorter bed lengths. The modular catalyst bed support can also include a flow distributor formed in part by the interior surfaces of the modules. The flow distributor can allow for redistribution of the fluid flow at an intermediate point in the reactor. The gap for allowing proper operation of the flow distributor can be provided by the gaps and/or volumes between the various surfaces of the modular catalyst bed support.

A modular catalyst bed support can be leveled sufficiently to approximate the levelness of a conventional catalyst bed. In a situation where an additional catalyst bed is desired in a single bed reactor, a modular catalyst bed support can allow for difficult and/or expensive installation of an additional catalyst bed without having to support the catalyst bed, e.g., via welding to the bulk structural portion of the reactor wall(s).

An additional consideration in design of the modular catalyst bed support can be the potential difference in expansion of the modular catalyst bed support relative to the reactor walls during operation. The thermal expansion characteristics of the modular catalyst bed support may differ from those of the reactor wall(s). Although the modular catalyst bed support typically does not contact the reactor wall(s) directly, a fill material between the platform and the reactor walls can be in contact. Additionally or alternately, the catalyst supported by the modular catalyst bed support can be in contact with the reactor wall(s). If differential expansion occurs between the modular catalyst bed support and the reactor, frictional forces can place additional load on the modular catalyst bed support. These additional forces can be accounted for in the design of the modular catalyst bed support.

Catalyst Loading and Unloading

In order to facilitate catalyst loading and unloading, the modular catalyst bed support can include a plurality of bed support hangers. The bed support hangers can provide support for the weight of the modular catalyst bed support during a catalyst change out. In some embodiments, during a catalyst change out, the catalyst above the modular catalyst bed support can be removed before the catalyst below the modular catalyst bed support. This can allow the bed support hangers to only have to support the weight of the modular catalyst bed support itself, without any extra weight due to catalyst particles.

The bed support hangers can be attached to the modular catalyst bed support at any convenient location. In an embodiment, a plurality of bed support hangers can be attached to end caps for the modular catalyst bed support at various locations around the perimeter of the modular catalyst bed support. Additionally or alternately, the bed support hangers can have approximately an "L" shape near the bottom of the hanger, so that a flange or portion of a hanger can be underneath the edge of the modular catalyst bed support. The bed support hangers can have a sufficient length to attach to both the modular catalyst bed support and to a structure above the modular catalyst bed support. Additionally or alternately, the bed support hangers can be attached to wires, cables, or rods that are attached to a structure above the modular catalyst bed support. For example, the bed support hangers (or wires attached to the bed support hangers) can be attached to the support beams for a flow distributor near the top of the reactor, or any other convenient choice.

The length of the bed support hangers for the wires connected to the bed support hangers) can be sufficient so that the bed support hangers do not provide any support for the weight of the modular catalyst bed support after a catalyst bed is loaded underneath the modular catalyst bed support. In order to accommodate this, the bed support hangers can include a linkage that allows adjustment of the length of the bed support hanger. For example, the bed support, hanger can be composed of two pieces. A first piece can be a rod that is attached to and that extends down from a structure toward the top of the reactor. The second piece can be attached to and/or extend underneath the modular catalyst bed support. The first and second pieces can be attached together using a joint that can allow for movement of the attachment point, such as a thermal expansion slot. When the reactor is empty, the bed support hanger can be fully extended as it supports the weight of the modular bed support. When a catalyst bed resides underneath the modular catalyst bed support, the joint can move within the thermal expansion joint to adjust the length of the hanger, e.g., to match the new position of the modular catalyst bed support. During operation, the thermal expansion joint can also allow the length of the hanger to adjust, e.g., in the event that the height of the underlying catalyst bed changes and/or in the event that the thermal expansion of various objects within the reactor is not the same.

The operation of the hanger supports can be described in relation to a catalyst loading and unloading cycle. As an example, consider a reactor that includes a modular catalyst bed support. Initially, the reactor can contain no catalyst. In this state, the modular catalyst bed support cannot be supported by an underlying catalyst bed, because no catalyst is present. Instead, the weight of the modular catalyst bed support can be supported using a plurality of bed support hangers.

Catalyst can then be added to the reactor. First, a catalyst bed can be added below the modular catalyst bed support. One or more of the modules of the modular catalyst bed support can be removed during loading of a catalyst bed underneath the modular catalyst bed support. In one embodiment, a central module of the modular catalyst bed support can be removed. Such a central module can be aligned with the center axis of the reactor. Creating an opening along the central axis can allow a conventional dense loading machine to be used to fill the first catalyst bed. Dense loading can be beneficial, as dense loading can assist with creating a level surface at the top of a catalyst bed. Because the modular catalyst bed support can rest on the underlying catalyst bed during hydroprocessing, a level catalyst bed surface can allow for the modular catalyst bed support to also be level. Additionally or alternately, one or more of the modules can be removed, so that sock loading of the catalyst bed can be performed through the resulting openings. Any other convenient method can additionally or alternately be used. Note that, during loading of the underlying catalyst bed, the modular catalyst bed support can be suspended at a height sufficient to allow catalyst loading. During loading, the modular catalyst bed support can be supported by any convenient method. The bed support hangers can be used to support the modular catalyst bed support. Additionally or alternately, one or more additional chains/cables can be used, such as those that may be connected to a crane.

After the first catalyst bed is loaded underneath the modular catalyst bed support, the modular catalyst bed support can be lowered onto the top surface of the catalyst bed. The modular catalyst bed support can then be supported by the underlying catalyst bed rather than by the bed support hangers. Optionally, the bed support hangers may not be attached to the modular catalyst bed support. In such an embodiment, when the catalyst bed support is resting on the underlying catalyst bed, the bottom of modular catalyst bed support can be separated from, and/or not in contact with, the surfaces of the bed support hangers used to support the modular catalyst bed support.

After the first catalyst bed is loaded, any modules removed from the modular catalyst bed support can be inserted into the corresponding openings. The modules can be inserted either before or after lowering of the modular catalyst bed support on to the lower catalyst bed. An upper catalyst bed can then be introduced above the modular catalyst bed support. The catalyst bed above the modular catalyst bed support can be introduced by any convenient method, such as dense loading and/or sock loading.

For unloading, the catalyst bed above the modular catalyst bed support can be removed using any convenient method, such as vacuum removal via a top manway. The catalyst bed above the modular catalyst bed support can be removed prior to removing the lower catalyst bed. After the upper catalyst bed is removed, the catalyst bed supporting the modular catalyst bed support can be removed. The lower catalyst bed can be removed, for example, using a catalyst exit at the bottom of the reactor. If desired, the lower catalyst bed could also be removed, e.g., using vacuum techniques by removing one or more of the catalyst modules.

OTHER EMBODIMENTS

Additionally or alternately, the invention can include one or more of the following embodiments.

Embodiment 1

A modular catalyst bed support that is not welded to the walls of a reactor, comprising: a lattice structure having a plurality of lattice openings; a plurality of endcap pieces attached to the lattice structure to form a lattice skirt; and a plurality of modules inserted into the lattice openings, a module comprising: a top surface, the plurality of module top surfaces forming a catalyst support surface; a bottom surface; and an interior surface that includes a lip, the lip overlapping one or more edges of the lattice structure when a module is inserted into a lattice opening, the plurality of module interior surfaces forming a flow distributor, wherein the modular catalyst bed support is formed from pieces that can pass through an opening having a diameter of about 28 inches or less, preferably 24 inches or less.

Embodiment 2

The modular catalyst bed support of embodiment 1, wherein the plurality of module bottom surfaces are suitable for supporting the weight of the modular catalyst bed support, and/or wherein a majority of the openings in the lattice structure correspond to a shape that forms a tessellation.

Embodiment 3

The modular catalyst bed support of any one of the above embodiments, wherein the lattice structure is optionally assembled from interlocking pieces without welding and includes at least two shapes of lattice openings, the lattice structure preferably including hexagonal shapes, half-hexagonal shapes, and two-third hexagonal shapes.

Embodiment 4

The modular catalyst bed support of any one of the above embodiments, further comprising a plurality of bed support hangers.

Embodiment 5

The modular catalyst bed support of embodiment 5, wherein at least a portion of a bed support hanger is underneath the lattice skirt.

Embodiment 6

The modular catalyst bed support of any one of the above embodiments, further comprising a fill material surrounding a portion of the lattice skirt, the fill material being in contact with the lattice skirt and in contact with an interior wall of the reactor.

Embodiment 7

The modular catalyst bed support of any one of the above embodiments, wherein the plurality of modules further comprise an open volume between the top surface and the interior surface.

Embodiment 8

The modular catalyst bed support of any one of the above embodiments, wherein the lattice openings in the lattice structure have a smaller area than an opening that the modular catalyst bed support pieces are passed through to enter the reactor.

Embodiment 9

A kit for assembly of a modular catalyst bed support that is not welded to the walls of a reactor, comprising: a plurality of lattice pieces that can be joined together to form a lattice structure having a plurality of lattice openings; a plurality of endcap pieces capable of being attached to the lattice structure to form a lattice skirt; and a plurality of modules capable of being inserted into the lattice openings, a module comprising: a top surface, the plurality of module top surfaces, when assembled, forming a catalyst support surface; a bottom surface; and an interior surface that includes a lip, the lip overlapping one or more edges of the lattice structure when a module is inserted into a lattice opening, the plurality of module interior surfaces forming a flow distributor when assembled, wherein the kit for assembly of the modular catalyst bed support is formed from pieces that can pass through an opening having a diameter of about 28 inches or less.

Embodiment 10

The modular catalyst bed support kit of embodiment 9, wherein the kit is formed from pieces that can pass through an opening having a diameter of about 24 inches or less, and/or wherein the lattice structure is assembled from interlocking pieces without welding.

Embodiment 11

A method for dividing a catalyst bed in a reactor without welding a catalyst bed platform to a structural portion of the reactor walls, comprising: passing a plurality of modular catalyst bed support components into a reactor through an opening having a diameter of about 28 inches or less, the reactor having a first catalyst bed volume, the modular catalyst bed support components including lattice components and a plurality of modules; constructing a modular catalyst bed support within the reactor using the modular catalyst bed support components; supporting the modular catalyst bed support with a plurality of bed support hangers; loading a lower catalyst bed in a lower catalyst bed volume; supporting the modular catalyst bed support on the lower catalyst bed; and loading an upper catalyst bed that is supported by the modular catalyst bed support in an upper catalyst bed volume.

Embodiment 12

The method of embodiment 11, wherein a catalyst bed volume in the reactor has a length to diameter ratio of at least about 6:1 prior to insertion of the modular catalyst bed support, and at least one of the upper catalyst bed volume and the lower catalyst bed volume has a length to diameter ratio of about 2.5 to 1 or less.

Embodiment 13

The method of embodiment 11 or embodiment 12, wherein loading an upper catalyst bed comprises inserting a plurality of foam elements during loading of the upper catalyst bed, inserting a layer of inert particles during loading of the upper catalyst bed, or a combination thereof.

Embodiment 14

The method of any one of embodiments 11-13, wherein constructing a modular catalyst bed support comprises: constructing a lattice structure from the lattice components, the lattice structure including a plurality of openings; inserting the modules into the plurality of openings; optionally assembling a plurality of endcaps around the lattice structure to form a lattice skirt; and optionally inserting a material in a gap between the lattice skirt and an inner wall of the reactor.

Embodiment 15

The method of any one of embodiments 11-14, wherein loading the lower catalyst bed in the lower catalyst volume comprises: supporting the modular catalyst bed support at a height within the reactor; loading the lower catalyst bed below the modular catalyst bed support; and lowering the modular catalyst bed support so that a bottom surface of the catalyst bed support contacts the lower catalyst bed.

EXAMPLES

Example of Modular Catalyst Bed Support

The following example will schematically illustrate various pieces of a modular catalyst bed support (that may form a kit) according to an embodiment of the invention. The assembly of such pieces into a modular catalyst bed support according to an embodiment of the invention is also schematically illustrated below.

FIG. 1 shows an example of a lattice structure 100 suitable for use in an embodiment of the invention. The lattice structure 100 in FIG. 1 is depicted before end caps have been added to the structure. In FIG. 1, the majority of the openings 110 in the lattice structure can correspond to a repeating pattern of hexagons. Toward the edge of the lattice structure, half-hexagon shapes 112 and two-third-hexagon shapes 113 can also be used to provide a better approximation of a circular shape.

Figure 2:
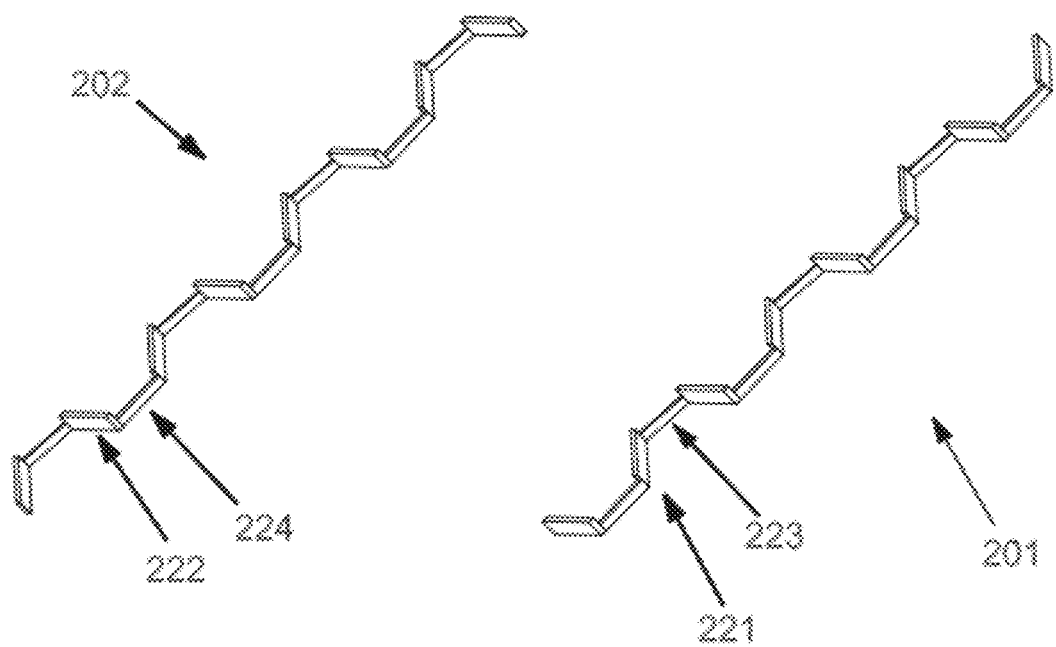
FIG. 2 schematically shows pieces of a lattice structure according to an embodiment of the invention.

FIG. 2 shows an example of individual lattice pieces 201 and 202 for constructing a lattice structure. In the example shown in FIG. 2, the individual lattice pieces can resemble a series of half-hexagon shapes, e.g., which can be contained in a kit for assembly of a modular catalyst bed support according to the invention. Lattice pieces 201 and 202 can be joined together to form hexagonal openings, such as openings 110 from FIG. 1. Lattice piece 201 can be composed of full hexagonal sides 221 and interlocking spines 223. Similarly lattice piece 202 can include full hexagonal sides 222 and interlocking spines 224. When a lattice structure is assembled, e.g., from a kit containing lattice pieces, the interlocking spines 223 and 224 from adjacent pieces can overlap, leading to a stable structure. Depending on the embodiment, one or more fasteners can be optionally used to secure adjacent lattice pieces, or the fastener(s) may be unnecessary. The combination of interlocking spines 223 and 224 from adjacent pieces can form an interlocking structure that provides the remaining sides for the hexagonal lattice shapes in the lattice structure. In the embodiment shown in FIG. 2, lattice piece 201 may not be a mirror image of lattice piece 202; e.g., lattice piece 202 may instead be rotated by 180 degrees relative to lattice piece 201.

Figures 3A, 3B:
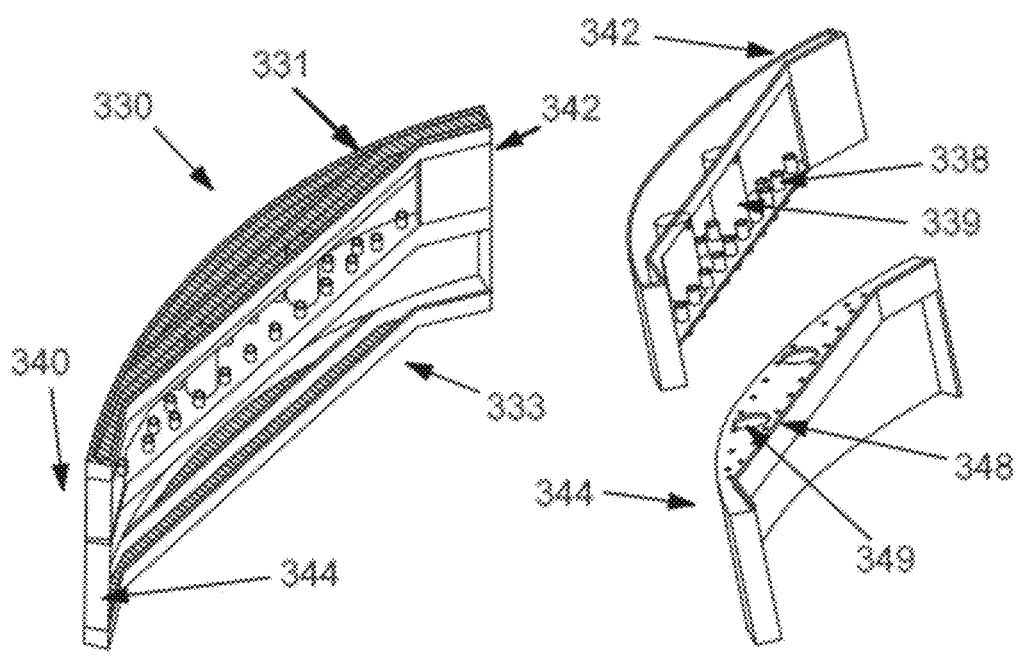
FIGS. 3a (left) and 3b (both on right) schematically show an endcap according to an embodiment of the invention.

FIGS. 3a and 3b show examples of structures that can be used as endcaps for the lattice structure. FIG. 3a shows an embodiment of an assembled endcap structure 330. The endcap structure 330 can include at least three surfaces. Top surface 331 can form part of a catalyst support grid. Bottom surface 333 can form part of the bottom or foot of the modular bed support. Interior surface 335 can form part of a flow distributor, such as a distributor tray.

In some embodiments, endcap structure 330 can be too large to pass through a manway or other existing opening in a reactor. In such embodiments, an endcap structure 330 can be passed into a reactor in pieces and then assembled inside the reactor. FIG. 3b shows an example of how the side plate 340 for endcap structure 330 can be divided into an upper side plate 342 and a lower side plate 344. FIG. 3b also provides a less restricted view of additional structure on the interior surface 335. In the embodiment shown in FIG. 3b, side plate 340 can be divided at the interior surface 335 of the endcap structure 330. Upper side plate 342 can include downcomers 338 and additional vapor chimneys 339. The downcomers 338 and additional vapor chimneys 339 can extend below the bottom of upper side plate 342. These extensions can be inserted into corresponding openings 348 and 349 in lower side plate 344. In addition to allowing fluid to pass through the flow distributor, this can assist in improving the structural stability of endcap structure 330, e.g., without requiring welding of the individual pieces.

Figure 4:
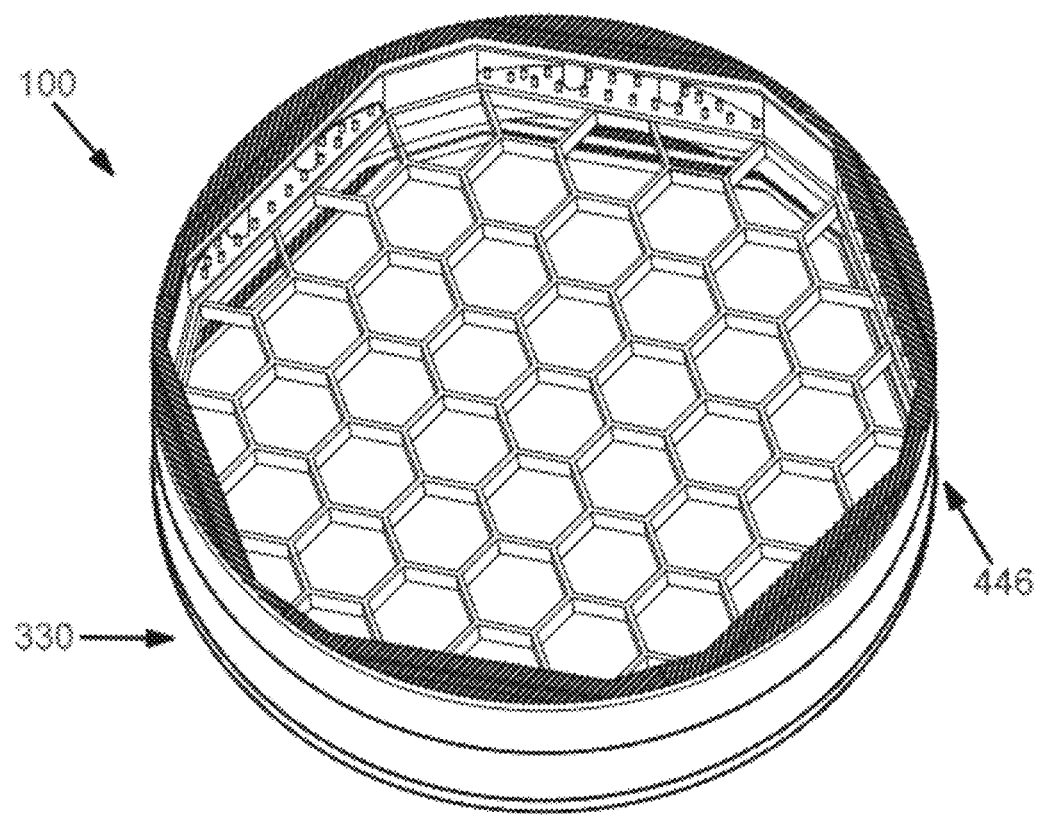
FIG. 4 schematically shows a lattice structure with an endcap skirt according to an embodiment of the invention.

FIG. 4 shows an example of adding endcap structures 330 to a lattice structure 100. Adding endcap structures 330 to a lattice structure 100 can provide a lattice skirt for a modular catalyst bed support. The endcap structures 330 in FIG. 4 include a lip 446 around the perimeter or lattice skirt of the modular catalyst bed support. The outer lip 446 can have a closer approach to the interior reactor wall than the rest of the endcap skirt. This can allow the outer lip 446 to support the insertion of a fill material between the endcap structures 330 and the interior wall of a reactor. A glass rope is one example of a fill material than can be used.

Figure 5A:
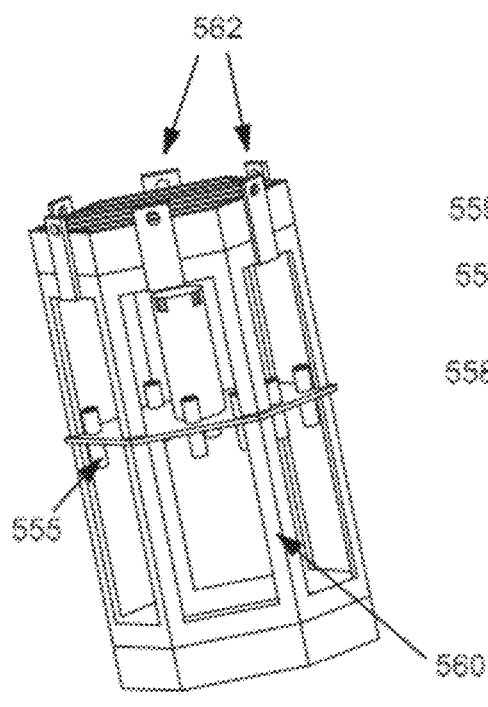
FIGS. 5a (left) and 5b (all three on right) schematically show a catalyst bed module according to an embodiment of the invention in a reactor.
Figure 5B:
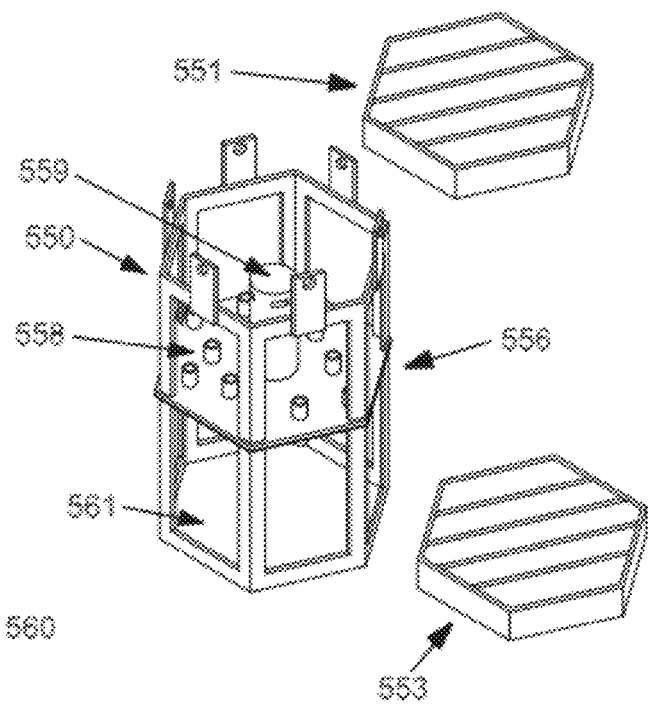

FIGS. 5a and 5b schematically show an embodiment of a module 550, e.g., from a kit containing multiple modules, for a modular catalyst bed support. FIG. 5a shows an assembled module 550. The assembled module 550 can include at least three surfaces. Top surface or grid 551 can form part of a catalyst support grid. Bottom surface 553 can form part of the bottom or foot of the modular bed support. Interior surface 555 can form part of a flow distributor, such as a distributor tray. Interior surface 555 can additionally or alternately include downcomers 558 to allow fluids to pass through the distributor tray. Vapor chimney(s) 559 can further additionally or alternately be included.

FIG. 5b shows another perspective view of various components of a module 550. The top surface 551 and bottom surface 553 are shown separately from the skeleton or "can" structure 560 of the module 550 to facilitate viewing of other portions of the module 550. In the skeleton structure 560, open volume 561 is provided above and below inferior surface 555. This open volume can improve the operation of the flow distributor that can be formed from the combination of the interior surfaces of interconnected modules. Flanges 562 at the top of skeleton structure 560 can be used to bolt together adjacent modules. The interior surface 555 can include a lip 556, which can advantageously assist in forming a seal between adjacent interior surfaces. The lip may also overlap the lattice structure 100, e.g., to provide additional stability.

Figure 6A:
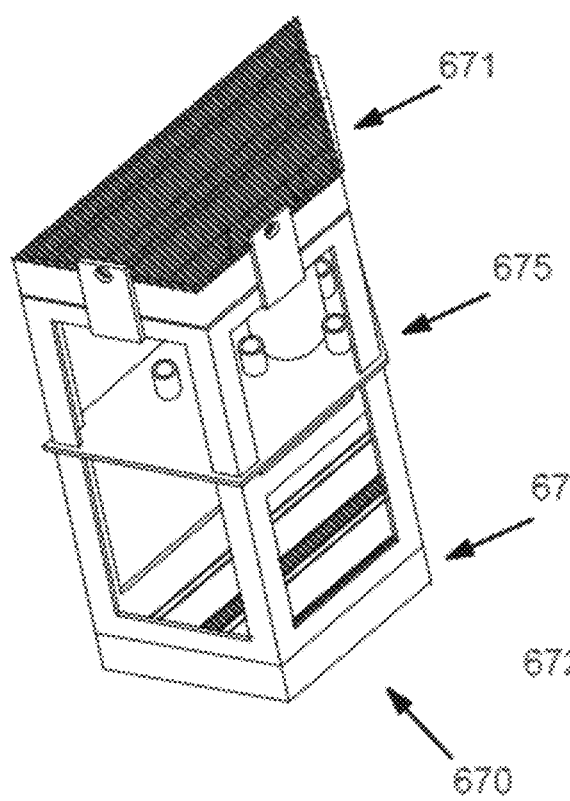
FIGS. 6a (left) and 6b (right) schematically show additional catalyst bed module shapes.
Figure 6B:
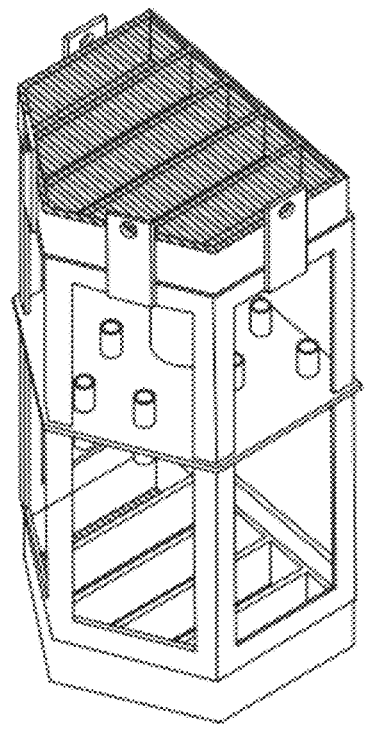

FIGS. 6a and 6b show alternate module geometries that can be used to form a modular catalyst bed support. Toward the edge of a lattice structure, the geometry of the reactor may create a gap large enough to be desirable to fill, yet too small to permit a full sized module. In this situation, a module with an alternate module geometry can be used. For the hexagonal lattice structure embodiment shown in FIG. 1, one alternate module geometry can correspond to a half-size module 670. The top surface 671, bottom surface 673, and interior surface 675 can be similar to the corresponding surfaces in a full size module. Another alternate module geometry can correspond to a two-third-size module 672.

Figure 7A:
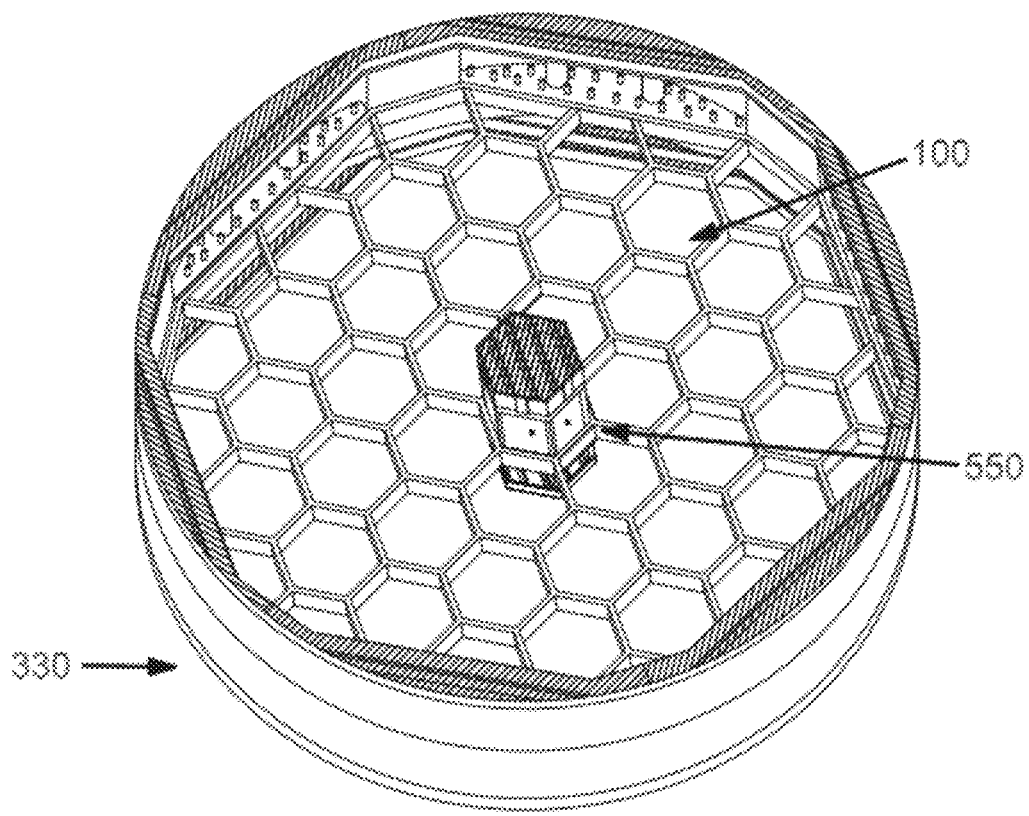
FIG. 7a schematically shows a lattice structure with a catalyst bed module inserted into a lattice opening.
Figure 7B:
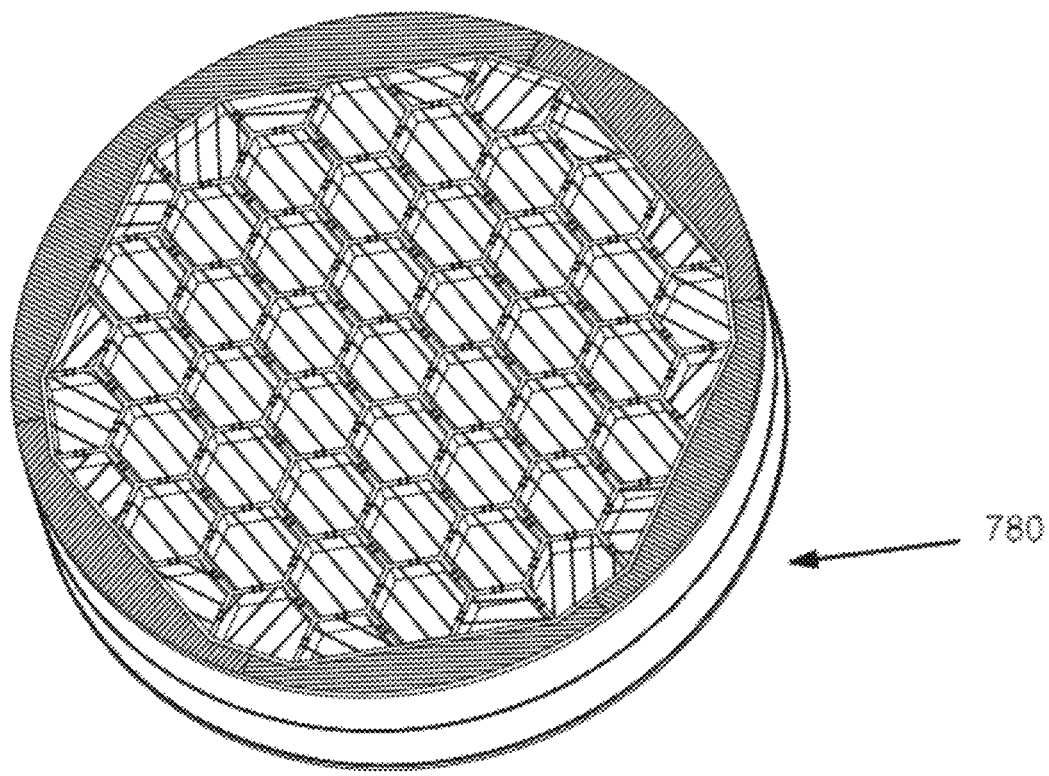
FIG. 7b shows an assembled modular catalyst bed support according to an embodiment of the invention.

FIG. 7a schematically shows a lattice structure 100 with endcaps 330 after insertion of a module 550 in the central opening of the lattice structure. Optionally, the lip of module 550 can be further sealed against lattice structure 100 using a suitable material, such as glass tape. Optionally, the lips of adjacent modules 550 can be further sealed against each other using a suitable material, such as glass tape. Modules 550 can be inserted into the other full size openings 110, while alternative geometry modules can be used to fill the half-size (670 in FIG. 6a) and/or two-third size (672 in FIG. 6b) openings. Inserting modules into the remaining openings can result in formation of a modular catalyst bed support 780, as shown in FIG. 7b.

Figure 8:
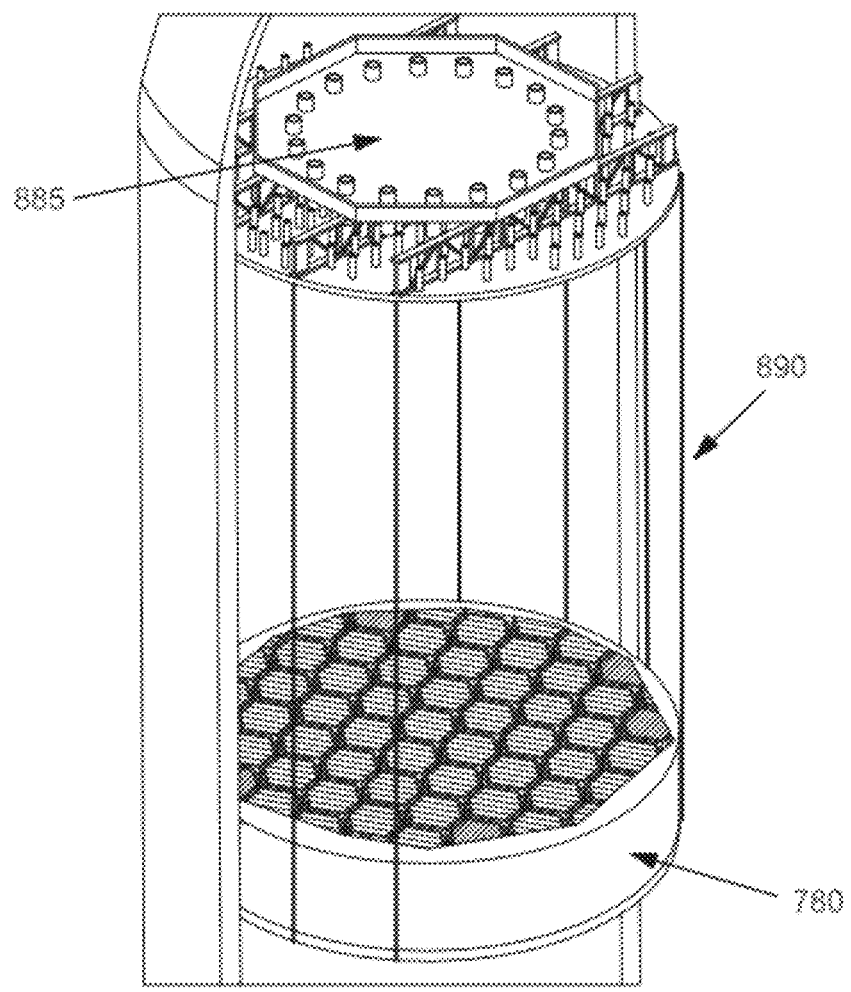
FIG. 8 shows an example of supporting a modular catalyst bed support with hangers according to an embodiment of the invention.

FIG. 8 schematically shows an example of supporting a modular catalyst bed support 780 using bed support hangers 890. In the embodiment shown in FIG. 8, the bed support hangers 890 can be attached to the support beams for an upper distributor tray 885 in a reactor. The bed support hangers 890 have an L-shaped flange (not shown) at the bottom underneath the modular catalyst bed support 780.

Figures 9A, 9B, 9C:
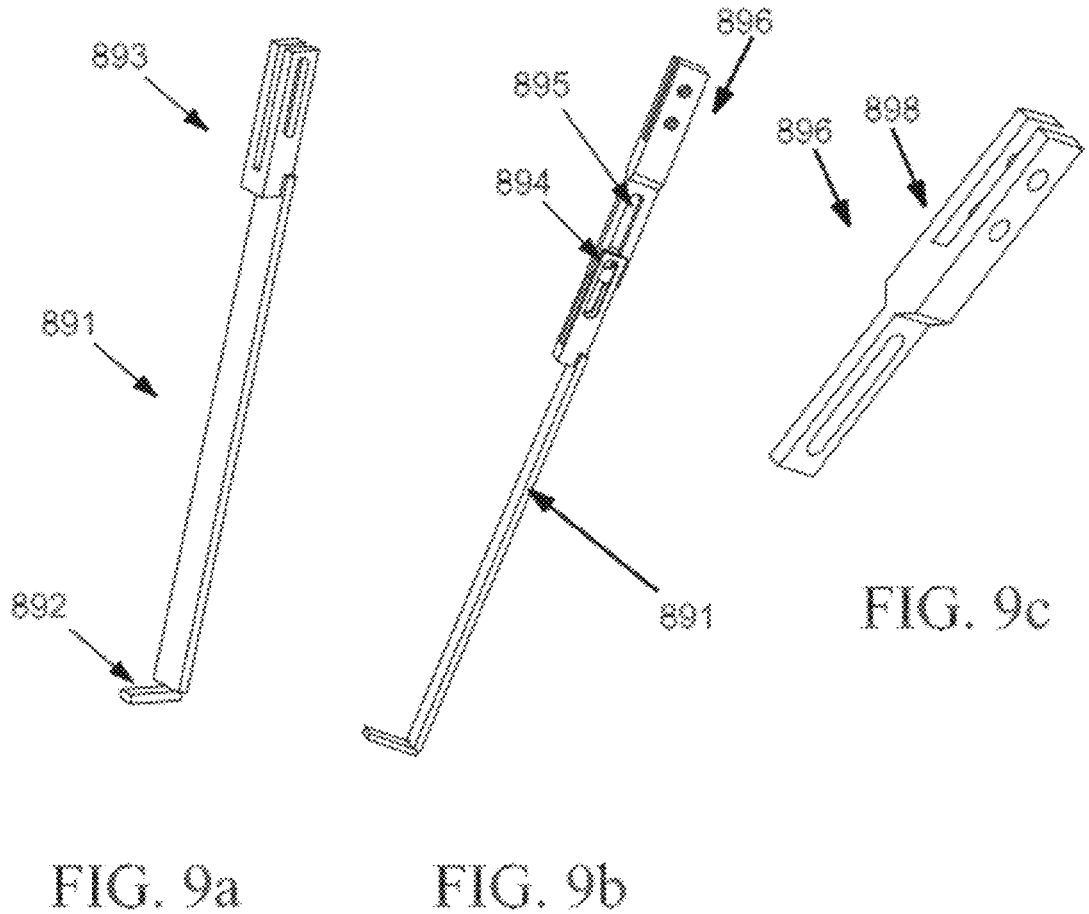
FIGS. 9a, (left), 9b (center), and 9c (right) schematically show a catalyst bed hanger according to an embodiment of the invention.

FIGS. 9a to 9c schematically provide a more detailed view of an embodiment of a bed support hanger. FIG. 9a shows the lower portion 891 of an embodiment of a bed support hanger. The L-shaped flange 892 can be underneath a modular catalyst bed support, e.g., to provide support when a lower catalyst bed is not present. As shown in FIG. 9b, the top grooved structures 893 can combine with a grooved structure 895 of upper portion 896 to provide a thermal expansion slot connection 894. This can allow the bed support hanger to change in length if necessary, such as due to differential thermal expansion and/or settlement by the underlying catalyst bed. FIG. 9c schematically shows a more detailed view of the top U-shaped structure 898 of upper portion 896. The U-shaped structure 898 can be bolted to an existing beam, such as a support beam from an upper distributor tray. Additionally or alternately, the U-shaped structure 898 can be bolted to any other convenient support structure that has a sufficient elevation in the reactor, including existing structures within the reactor and/or additional structures added for the purpose of supporting the bed support hangers.

Figure 10:
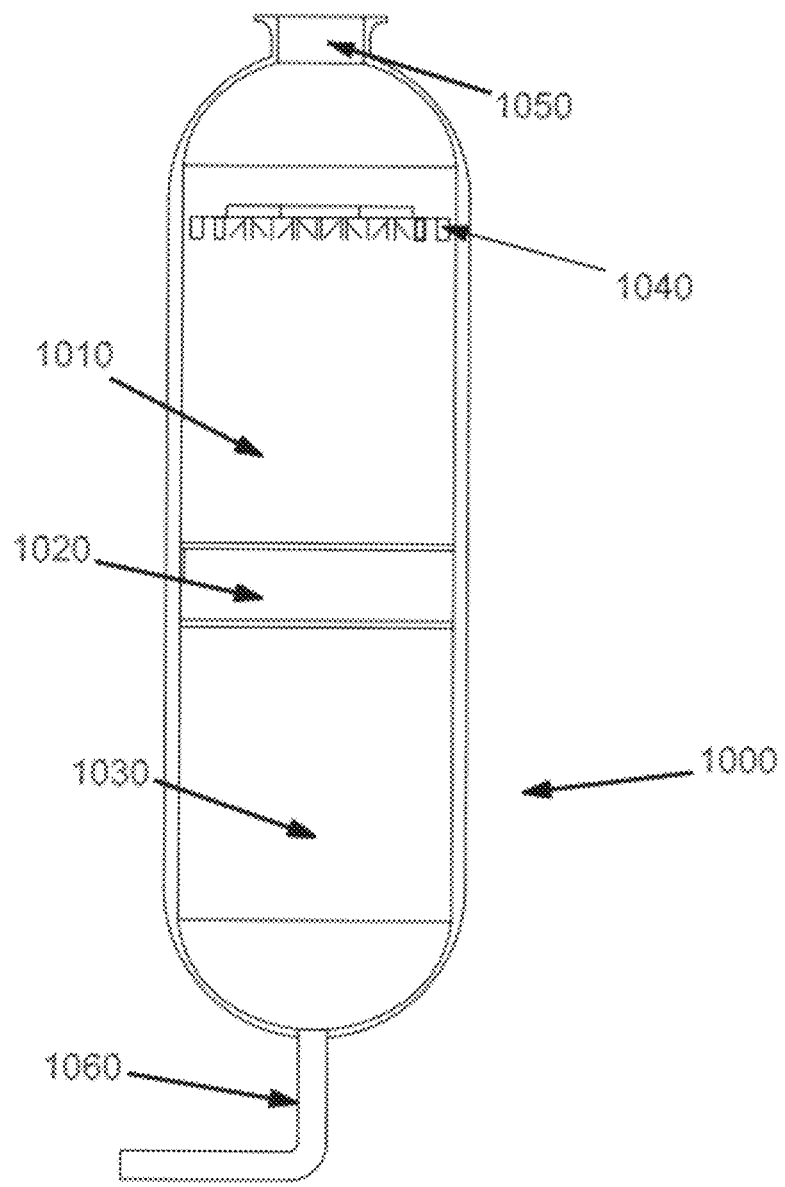
FIG. 10 shows an example of a reactor that includes a modular catalyst bed support.

FIG. 10 schematically shows an example of a reactor that includes a modular catalyst bed support. In FIG. 10, reactor 1000 can include two catalyst beds. The first catalyst bed 1010 can be supported by the modular catalyst bed support 1020. The modular catalyst bed support 1020 can be supported by second catalyst bed 1030. A top flow distributor in the reactor is also shown as reference numeral 1040. Bed support hangers for the modular catalyst bed support 1020 are not shown. Top manway 1050 can be used for introducing the pieces (e.g., from a kit) for assembling modular catalyst bed support 1020 into the reactor 1000. During hydroprocessing, fluids introduced into the reactor can pass through top flow distributor 1040. The fluids can then be exposed to hydroprocessing conditions in the presence of first catalyst bed 1010. The fluids can be re-distributed, e.g., by a flow distributor, within modular catalyst bed support 1040. The fluids can then be exposed to hydroprocessing conditions in the presence of second catalyst bed 1030. The effluent from the hydroprocessing reaction can exit the reactor 1000 via outlet 1060.

Example of Use in Hydroprocessing

In this example, a modular catalyst bed support can be used to add a catalyst bed to a hydroprocessing reactor. For purposes of this example, a reactor that originally has a single catalyst bed can be used. During a catalyst turn-around, the modular catalyst bed support can be constructed within the reactor. The reactor can then be loaded with two beds of catalyst. A first hydroprocessing catalyst can be loaded in the lower (original) catalyst bed, while a second hydroprocessing catalyst can be loaded on the new catalyst bed platform. The first and second hydroprocessing catalysts can be the same or different. Optionally, the first and second hydroprocessing catalysts can be catalyst systems, and can comprise a series of catalysts stacked on top of one another. The first and second hydroprocessing catalysts can be selected from any convenient catalyst/system for hydrotreatment, catalytic dewaxing, hydrofinishing, and/or other hydroprocessing functions.

In this example, the reactor can be configured for diesel hydroprocessing. Insertion of the modular catalyst bed support can allow for hydrotreatment of a diesel feed using two separate types of catalysts, or both catalyst beds can include similar type of catalyst (e.g., the same catalyst). In this example, the first and second hydroprocessing catalysts can be selected to both be diesel hydrotreatment catalysts. The reactor can then be operated under effective hydrotreatment conditions. In certain applications, a modular catalyst bed support can be added to a reactor used for hydrocracking, chemicals processing, and/or other types of catalytic processes that can benefit from the addition of a catalyst bed to a reactor.

Additionally or alternatively, a modular catalyst bed support can be included in a reactor having any convenient number of beds. For example, in a reactor with two catalyst beds, a modular catalyst bed support can be added to split either (or both) of the existing beds. A modular catalyst bed support can be similarly employed in a reactor with three or more catalyst beds.

In various embodiments, a suitable catalyst for hydrotreatment, aromatic saturation, and/or hydrofinishing can be a catalyst comprising one or more Group VIII and/or Group VIB metals, optionally on a support. Suitable metal oxide supports can include low acidic oxides such as silica, alumina, silica-aluminas, titania, or the like, or combinations thereof. The metal(s), which may be supported or in the form of a bulk catalyst, can include Co, Ni, Fe, Mo, W, Pt, Pd, Rh, Ir, and combinations thereof. In one embodiment, the metal can be Pt and/or Pd. Additionally or alternatively, the metal can be one or more of Co, Ni, Mo, and W, such as CoMo, NiMo, NiNV, or NiMoW. In such embodiments, the amount of metal(s), either individually or in mixtures, can be at least about 0.1 wt %, for example at least about 0.25 wt %, at least about 0.5 wt %, at least about 0.6 wt %, at least about 0.75 wt %, or at least about 1 wt %, based on the weight of the catalyst composition. Additionally or alternatively, the amount of metal(s), either individually or in mixtures, can be about 35 wt % or less, for example about 30 wt % or less, about 25 wt % or less, about 20 wt % or less, about 15 wt % or less, about 10 wt % or less, about 5 wt % or less, or about 3 wt % or less, based on the weight of the catalyst composition. In embodiments wherein the metal is a supported noble metal, the amount of metal(s) can typically be less than about 2 wt %, for example less than about 1 wt %, based on the weight of the catalyst composition. Additionally or alternatively in such embodiments, the amount of metal(s) can be about 0.9 wt % or less, for example about 0.75 wt % or less or about 0.6 wt % or less, based on the weight of the catalyst composition. The amounts of metals may be measured by methods specified by ASTM for individual metals including atomic absorption spectroscopy and/or inductively coupled plasma-atomic emission spectrometry. In some embodiments, the hydrotreating catalyst can be catalyst with a relatively low level of hydrogenation activity, such as a catalyst containing Co as a Group VIII metal, as opposed to a catalyst containing Ni, Pt, and/or Pd as a Group VIII metal. In certain embodiments otherwise characterized as hydrotreating embodiments, at least a portion of one or more catalyst beds or stages therein can include a type of catalyst other than strictly a hydrotreating catalyst, such as a hydrocracking catalyst, a hydrofinishing catalyst, and/or a dewaxing catalyst.

The hydrotreating conditions can include one or more of: a temperature of at least about 260° C., for example at least about 300° C.; a temperature of about 425° C. or less, for example about 400° C. or less or about 350° C. or less; a liquid hourly space velocity (LHSV) of at least about 0.1 $hr^{-1}$, for example at least about 0.3 $hr^{-1}$, at least about 0.5 $hr^{-1}$, or at least about 1.0 $hr^{-1}$; an LHSV of about 10.0 $hr^{-1}$ or less, for example about 5.0 $hr^{-1}$ or less or about 2.5 $hr^{-1}$ or less; a hydrogen partial pressure in the reactor from about 200 psig (about 1.4 MPag) to about 3000 psig (about 20.7 MPag), for example about 400 psig (about 2.8 MPag) to about 2000 psig (about 13.8 MPag); a hydrogen to feed ratio (hydrogen treat gas rate) from about 500 scf/bbl (about 85 $Nm^3/m^3$) to about 10000 scf/bbl (about 1700 $Nm^3/m^3$), for example from about 1000 scf/bbl (about 170 $Nm^3/m^3$) to about 5000 scf/bbl (about 850 $Sm^3/m^3$).

Additional Configurations—Virtual Flow Distributor

One of the potential reasons to add a modular catalyst bed support can be to allow for the introduction of an additional flow distributor to a reactor. An additional flow distributor can improve the efficiency of catalyst usage in a reactor. In some reactors, the reactivity of a catalyst in a reactor can be lower than what would be expected based on small scale testing. This can be due to inefficiencies in how fluids are distributed in the reactor. If part of the inefficiency is due to poor distribution of liquids within the reactor, a flow distributor can improve the contact of liquids with the catalyst.

Additional structures and/or catalyst configurations can be used to improve catalyst efficiency within a reactor. These structures and/or catalyst configurations can be used in conjunction with a modular catalyst bed support, and/or in a reactor that does not include a modular catalyst bed support.

In some situations, it may be desirable to introduce an additional flow distributor into a reactor without having to introduce a separate catalyst bed platform. A typical flow distribution device, such as a distributor tray, can typically benefit from having an open volume above and below the distributor tray. This can increase the amount of catalyst to be removed from the reactor in order to add the distributor tray. This can additionally or alternately reduce the amount of benefit derived from the distributor tray, as the increased catalyst efficiency can be offset by the loss of some catalyst volume.

In an embodiment, a virtual flow distributor can be introduced into a reactor without requiring addition of a catalyst bed platform or modular catalyst bed support. A virtual flow distributor can be created, for instance, using one or more foam elements. The foam elements can be made of a porous and/or reticulated foam. The porous foam elements can take a liquid and/or vapor stream from above the foam and re-distribute the stream over a broader area.

In embodiments where one or more foam elements are introduced into a reactor, one option can involve tightly packing a layer of foam elements, e.g., such that substantially all liquid and gas passing down through the reactor can pass through a foam element. Alternately, two or more layers of foam elements can be stacked in overlapping layers. The two or more layers can be stacked, e.g., so that liquid stream passing vertically through a reactor can contact at least one foam element along the path of the liquid. For foam elements stacked above one another, it is noted that fluid entering a first foam element may be re-distributed and exit the first foam element above a second foam element. This fluid can be re-distributed again by the second foam element.

As an example of use, foam elements can be used to form a virtual flow distributor in a reactor. A first portion of catalyst can be loaded into the reactor. An inert material can then be loaded above the first portion of catalyst, such as about 0.25 inch (about 0.6 cm) diameter balls. The inert layer can assist with preventing movement of the foam elements relative to the catalyst beds and/or relative to each other. The inert layer can have a thickness of about 1 cm to about 20 cm or more. A layer of foam elements can then be placed on the first catalyst bed. The foam elements can have a thickness of about 1 cm to about 10 cm, so the corresponding layer can have a similar thickness. Additional inert materials can be added to fill the space between the foam elements and/or to form a layer of inert materials above the foam elements. Additional layers of foam elements and inert materials can then be inserted until a desired number of foam elements layers are achieved. A second layer of catalyst can then be placed above the final inert material layer.

Figure 11:
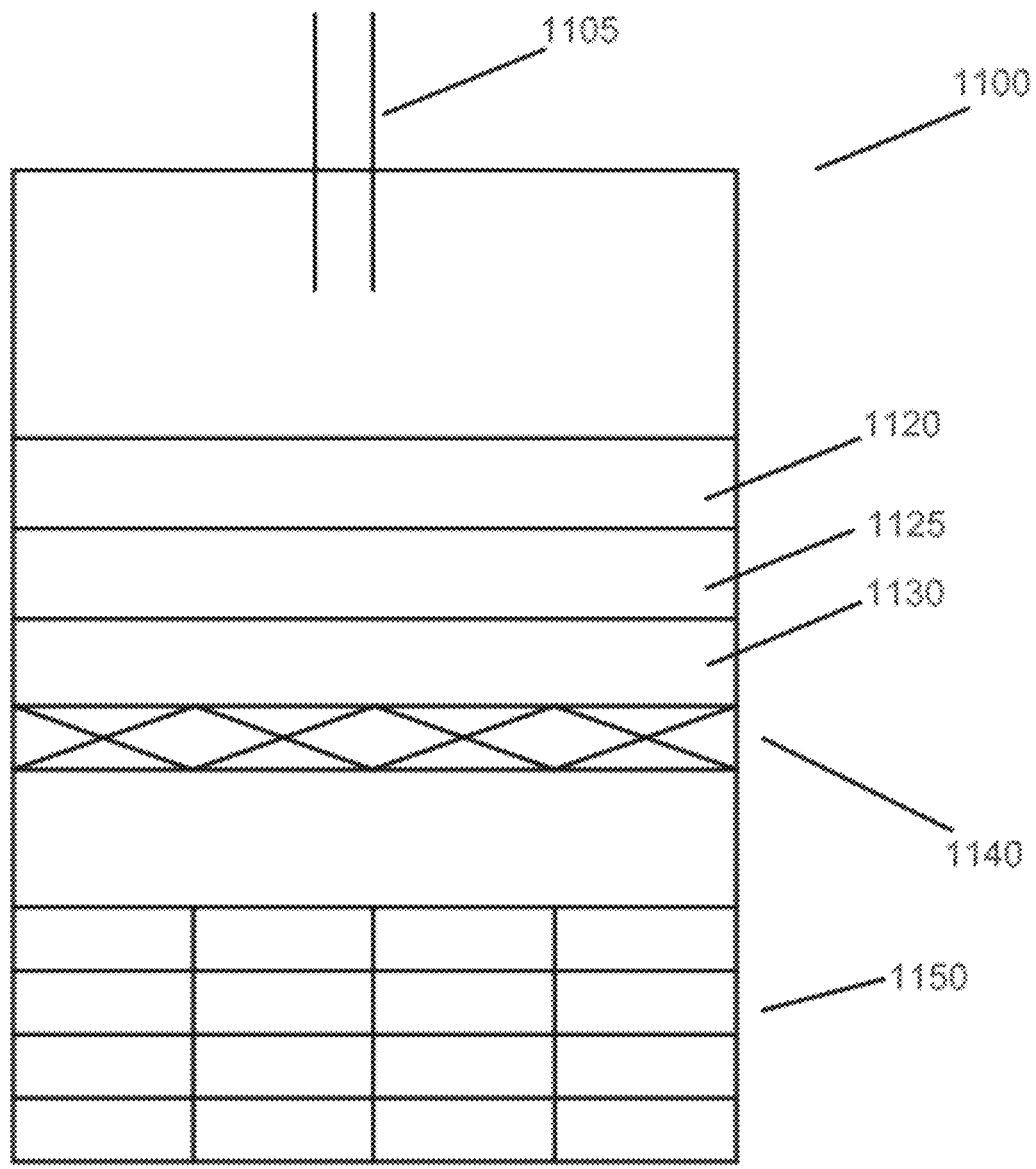
FIG. 11 schematically shows an example of a configuration for a reactor test platform.

FIG. 11 shows an example of a test column 1100 that was used to investigate use of foam elements for re-distribution of fluids. In the test column represented by FIG. 11, a point source 1105 of a liquid was introduced into test column 1100. The point source 1105 of liquid had a stream size that was narrow relative to the width of the test column. In one configuration, layers 1120, 1125, and 1130 were layers of particles of a size typical for catalyst particles. In a second configuration, layers 1120 and 1130 were layers of the typical size particles. However, in the second configuration, layer 1125 was a porous foam element having a width that approximately matched the column. As a result, the porous foam element used in the second configuration represented a tightly packed foam element layer that substantially all liquids and gases in the reactor had to pass through. In each configuration, the catalyst layer 1130 was supported by catalyst support grid 1140. At the outlet of the test column 1100 was a patternator 1150 for capturing the liquid output, which allowed the output of the column to be characterized as being in one of 16 bins.

Figure 12A:
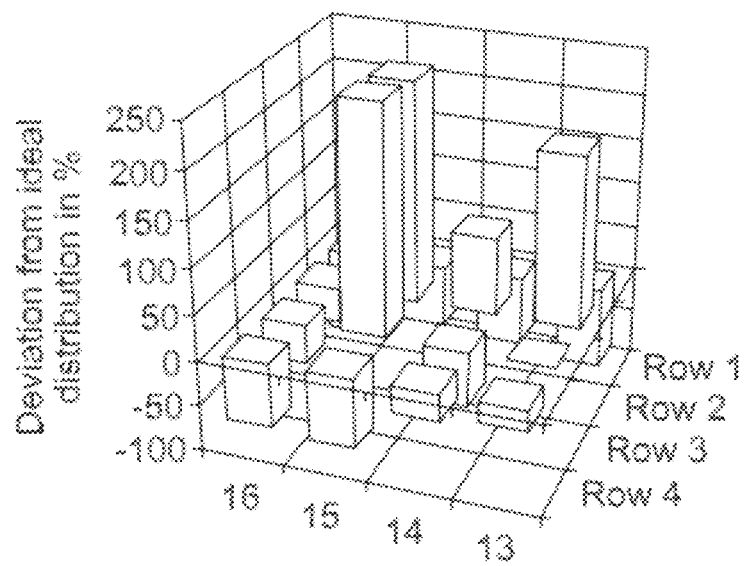
FIGS. 12a (top) and 12b (bottom) show results from tests in the reactor test platform.
Figure 12B:
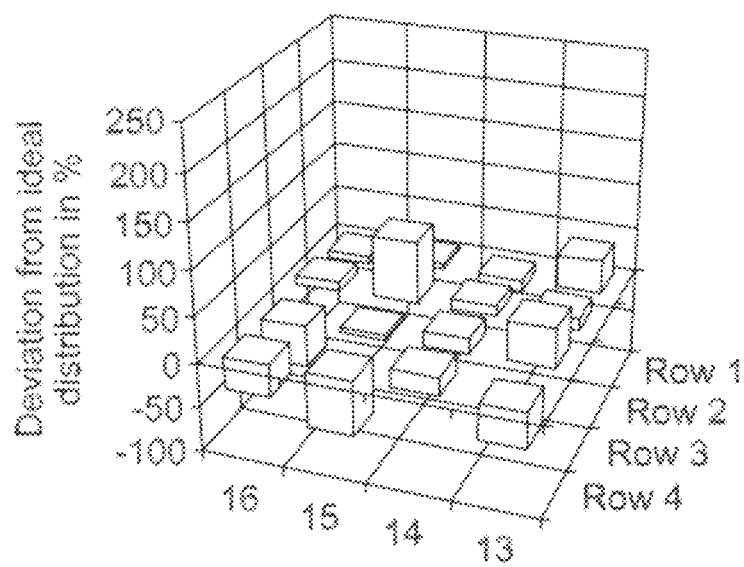

FIG. 12a shows the liquid distribution measured using the patternator for the first configuration containing only catalyst beds. As shown in FIG. 12a, the output flow for the first configuration was heavily concentrated in only a few bins. This indicates a poor distribution relative to an idealized distribution where each bin would have received roughly the same amount of liquid. FIG. 12b shows the liquid distribution for the second configuration, where layer 1125 contained a foam element instead of a catalyst layer. FIG. 12b indicates that, though some variation can still exist in the amount of liquid reaching each bin of the patternator, the amount of difference between bins is sharply reduced. The pattern shown in FIG. 12b appears to be a more suitable pattern for achieving efficient use of a catalyst layer during a catalytic process.

Additional/Alternate Configurations—Mitigating Hydrogen Starvation

An additional or alternate potential cause for inefficient use of hydroprocessing catalyst can be lack of availability of hydrogen within a catalyst bed. During hydroprocessing, a desired hydroprocessing reaction can be dependent on the availability of hydrogen in the reaction environment. If the amount of hydrogen in a catalyst bed becomes depleted in a local region, the feedstock flowing through that local region may not be exposed to the desired reaction conditions. Instead, the feedstock may undergo no reaction, and/or the feedstock may react in a non-desirable manner, such as by forming coke.

A feedstock may additionally or alternately not flow through a catalyst bed in an evenly distributed manner. Instead, a feedstock may preferentially flow through certain portions of the catalyst in a catalyst bed for one or more of a variety of reasons. If this occurs, the amount of hydrogen in the preferential flow regions may become depleted.

In an embodiment, one option for mitigating hydrogen depletion can be to include an intermediate zone/layer in a catalyst bed containing (relatively) inert packing materials. In the inert packing layer, hydrogen consumption can be reduced or stopped entirely. This can allow the opportunity for hydrogen present in a flow to distribute laterally, thus allowing the hydrogen concentration to build up in an area depleted due to preferential flow. The zone of inert packing materials can additionally or alternatively help to reduce the amount of preferential flow, e.g., by redistributing the flow within the catalyst bed.

An inert packing zone/layer within a catalyst bed can be created during loading of a catalyst bed. First, a layer of catalyst can be loaded. The inert layer can then be added by loading any convenient type of inert materials. One option can be to use graded layers of inert materials. For example, the inert materials can be spherical or approximately spherical particles. The inert spheres loaded on top of the catalyst can have a smaller size, such as about 1/32 inches (about 0.08 cm). Two or more types of inert spheres can be loaded in the layer, so that larger spheres such as having about a 1-inch (about 2.5 cm) can be used in the middle of the inert layer. The order of the sphere sizes can then be reversed, so that the smaller spheres will be at the top of the inert layer. The remainder of the catalyst for the catalyst bed can then be loaded on top of the inert layer.

While the above example describes the use of spherical particles, any other convenient shape of inert particles can be used. Such shapes can include multi-lobe shapes, such as trilobes. Wagon wheel and/or annular shapes can additionally or alternately be used, and any gradations may be based on diameter, shape, or both. In addition to inert particles, the inert zone/layer may include inert metal slats/gutters.

One or more inert layers can be included at any convenient location within a catalyst bed. In addition to inert layers within a bed, an inert layer at the top of a catalyst bed may also assist in distributing a fluid flow more evenly in the catalyst bed from the start.

While the present invention has been described and illustrated by reference to particular embodiments, those of ordinary skill in the art will appreciate that the invention can lend itself to variations not necessarily illustrated herein. For this reason, then, reference should be made solely to the appended claims for purposes of determining the enforceable scope of the present invention.

What is claimed is:

1. A modular catalyst bed support that is not welded to the walls of a reactor, comprising:
    a lattice structure having a plurality of lattice openings;
    a plurality of endcap pieces attached to the lattice structure to form a lattice skirt; and
    a plurality of modules inserted into the lattice openings, a module comprising:
        a top surface, the plurality of module top surfaces forming a catalyst support surface;
        a bottom surface; and
        an interior surface that includes a lip, the lip overlapping one or more edges of the lattice structure when a module is inserted into a lattice opening, the plurality of module interior surfaces forming a flow distributor,
    wherein the modular catalyst bed support is formed from pieces that can pass through an opening having a diameter of about 28 inches or less.

2. The modular catalyst bed support of claim 1, wherein the plurality of module bottom surfaces are suitable for supporting the weight of the modular catalyst bed support.

3. The modular catalyst bed support of claim 1, wherein a majority of the openings in the lattice structure correspond to a shape that forms a tessellation.

4. The modular catalyst bed support of claim 1, wherein the lattice structure is optionally assembled from interlocking pieces without welding and includes at least two shapes of lattice openings corresponding to at least one of hexagonal shapes, half-hexagonal shapes, and two-third hexagonal shapes.

5. The modular catalyst bed support of claim 1, further comprising a plurality of bed support hangers, wherein at least a portion of a bed support hanger is underneath the lattice skirt.

6. The modular catalyst bed support of claim 1, wherein the modular catalyst bed support is formed from pieces that can pass through an opening having a diameter of about 24 inches or less.

7. The modular catalyst bed support of claim 1, further comprising a fill material surrounding a portion of the lattice skirt, the fill material being in contact with the lattice skirt and in contact with an interior wall of the reactor.

8. The modular catalyst bed support of claim 1, wherein the plurality of modules further comprise an open volume between the top surface and the interior surface.

9. The modular catalyst bed support of claim 1, wherein the lattice openings in the lattice structure have a smaller area than an opening that the modular catalyst bed support pieces are passed through to enter the reactor.

10. A kit for assembly of a modular catalyst bed support that is not welded to the walls of a reactor, comprising:
   a plurality of lattice pieces that can be joined together to form a lattice structure having a plurality of lattice openings;
   a plurality of endcap pieces capable of being attached to the lattice structure to form a lattice skirt; and
   a plurality of modules capable of being inserted into the lattice openings, a module comprising:
      a top surface, the plurality of module top surfaces, when assembled, forming a catalyst support surface;
      a bottom surface; and
      an interior surface that includes a lip, the lip overlapping one or more edges of the lattice structure when a module is inserted into a lattice opening, the plurality of module interior surfaces forming a flow distributor when assembled,
   wherein the kit for assembly of the modular catalyst bed support is formed from pieces that can pass through an opening having a diameter of about 28 inches or less.

11. The kit for assembly of a modular catalyst bed support of claim 10, wherein the kit for assembly of the modular catalyst bed support is formed from pieces that can pass through an opening having a diameter of about 24 inches or less.

12. The kit for assembly of a modular catalyst bed support of claim 10, wherein the lattice structure is assembled from interlocking pieces without welding.

13. A method for dividing a catalyst bed in a reactor without welding a catalyst bed platform to a structural portion of the reactor walls, comprising:
   passing a plurality of modular catalyst bed support components into a reactor through an opening having a diameter of about 28 inches or less, the reactor having a first catalyst bed volume, the modular catalyst bed support components including lattice components and a plurality of modules;
   constructing a modular catalyst bed support within the reactor using the modular catalyst bed support components;
   supporting the modular catalyst bed support with a plurality of bed support hangers;
   loading a lower catalyst bed in a lower catalyst bed volume;
   supporting the modular catalyst bed support on the lower catalyst bed; and
   loading an upper catalyst bed that is supported by the modular catalyst bed support in an upper catalyst bed volume.

14. The method of claim 13, wherein a catalyst bed volume in the reactor has a length to diameter ratio of at least about 6:1 prior to insertion of the modular catalyst bed support, and at least one of the upper catalyst bed volume and the lower catalyst bed volume has a length to diameter ratio of about 2.5 to 1 or less.

15. The method of claim 13, wherein loading an upper catalyst bed comprises inserting a plurality of foam elements during loading of the upper catalyst bed.

16. The method of claim 13, wherein loading an upper catalyst bed comprises inserting a layer of inert particles during loading of the upper catalyst bed.

17. The method of claim 13, wherein constructing a modular catalyst bed support comprises:
   constructing a lattice structure from the lattice components, the lattice structure including a plurality of openings; and
   inserting the modules into the plurality of openings.

18. The method of claim 17, wherein constructing a modular catalyst bed support further comprises assembling a plurality of endcaps around the lattice structure to form a lattice skirt.

19. The method of claim 18, wherein supporting the modular catalyst bed support on a lower catalyst bed comprises supporting the modular catalyst bed support without the lattice skirt contacting an inner wall of the reactor so that a gap is formed between the lattice skirt and the inner wall of the reactor, the method further comprising inserting a fill material in the gap between the lattice skirt and the inner wall of the reactor.

20. The method of claim 13, wherein loading the lower catalyst bed in the lower catalyst volume comprises:
   supporting the modular catalyst bed support at a height within the reactor;
   loading the lower catalyst bed below the modular catalyst bed support; and
   lowering the modular catalyst bed support so that a bottom surface of the catalyst bed support contacts the lower catalyst bed.

* * * * *